(12) United States Patent
Lecube Inchausti et al.

(10) Patent No.: US 10,488,080 B2
(45) Date of Patent: Nov. 26, 2019

(54) AZIMUTHAL ROTATION MECHANISM FOR SOLAR TRACKERS

(71) Applicant: SENER, INGENIERIA Y SISTEMAS, S.A., Las Arenas (ES)

(72) Inventors: Xabier Lecube Inchausti, Las Arenas (ES); Eduardo Villarroel Pinedo, Las Arenas (ES); Jesus Maria Lata Perez, Las Arenas (ES)

(73) Assignee: SENER, INGENIERIA Y SISTEMAS, S.A., Las Arenas (ES)

( * ) Notice: Subject to any disclaimer, the term of this patent is extended or adjusted under 35 U.S.C. 154(b) by 214 days.

(21) Appl. No.: 15/322,681

(22) PCT Filed: Jun. 2, 2015

(86) PCT No.: PCT/EP2015/062223
§ 371 (c)(1),
(2) Date: Dec. 28, 2016

(87) PCT Pub. No.: WO2016/000895
PCT Pub. Date: Jan. 7, 2016

(65) Prior Publication Data
US 2017/0138638 A1 May 18, 2017

(30) Foreign Application Priority Data

Jun. 30, 2014 (ES) .................................. 201430983

(51) Int. Cl.
*F24S 30/428* (2018.01)
*F24S 30/422* (2018.01)
(Continued)

(52) U.S. Cl.
CPC ........... *F24S 30/428* (2018.05); *F24S 30/422* (2018.05); *F24S 30/452* (2018.05); *F24S 2030/115* (2018.05); *Y02E 10/47* (2013.01)

(58) Field of Classification Search
CPC ........ F24S 30/40; F24S 30/422; F24S 30/452; F24S 30/48; F24S 2030/115; F24S 50/20; Y02E 10/47; H02S 20/32; F24J 2/54
(Continued)

(56) References Cited

U.S. PATENT DOCUMENTS 4,256,088 A * 3/1981 Vindum ................ G01S 3/7861
126/571
6,123,067 A * 9/2000 Warrick ................ G01S 3/7861
126/593
(Continued)

FOREIGN PATENT DOCUMENTS

| EP | 2657624 A1 | 10/2013 |
|---|---|---|
| WO | 2008148919 A2 | 12/2008 |
| WO | 2013178850 A1 | 12/2013 |

OTHER PUBLICATIONS

International Search Report dated Aug. 28, 2015 for PCT/EP2015/062223.
(Continued)

*Primary Examiner* — Gregory L Huson
*Assistant Examiner* — Nikhil P Mashruwala
(74) *Attorney, Agent, or Firm* — Lucas & Mercanti, LLP

(57) ABSTRACT

Azimuthal rotation mechanism for solar trackers having a vertical pedestal (1) on which a rotating support (2) holding the solar panels (7) is mounted, which is actuated by at least three hydraulic cylinders (4, 5 and 6) located in the same horizontal plane and articulated through the casing to the rotating support (2) by a first movable vertical shaft (18), while the piston rods of the three cylinders pass through the wall of the rotating support and are articulated at the same height to the pedestal by a second fixed vertical rotation shaft (21).

6 Claims, 7 Drawing Sheets

(51) Int. Cl.
*F24S 30/452* (2018.01)
*F24S 30/00* (2018.01)

(58) Field of Classification Search
USPC .......................................................... 126/604
See application file for complete search history.

(56) References Cited

U.S. PATENT DOCUMENTS

| | | | | |
|---|---|---|---|---|
| 8,418,686 | B1* | 4/2013 | Liao | F24S 30/452 |
| | | | | 126/571 |
| 9,954,481 | B2* | 4/2018 | Huang | F16H 25/20 |
| 2007/0039610 | A1* | 2/2007 | Head | F24S 30/425 |
| | | | | 126/605 |
| 2012/0174966 | A1* | 7/2012 | Snipes | F24S 23/75 |
| | | | | 136/248 |
| 2012/0180846 | A1* | 7/2012 | Gonzalez Rodriguez | F24S 30/455 |
| | | | | 136/246 |
| 2013/0333689 | A1* | 12/2013 | Umemoto | F24S 30/45 |
| | | | | 126/605 |
| 2014/0013879 | A1* | 1/2014 | Enrile Medina | F15B 15/06 |
| | | | | 74/102 |
| 2015/0108314 | A1* | 4/2015 | Ceron Garcia | G01S 3/7861 |
| | | | | 248/425 |
| 2015/0354858 | A1* | 12/2015 | Ba-abbad | F24S 30/45 |
| | | | | 126/601 |
| 2019/0120526 | A1* | 4/2019 | Pena Sagastuy | F24S 30/45 |

OTHER PUBLICATIONS

Written Opinion dated Aug. 28, 2015 for PCT/EP2015/062223.
International Preliminary Report on Patentability dated Jul. 1, 2016 for PCT/EP2015/062223.

* cited by examiner

AZIMUTHAL ROTATION MECHANISM FOR SOLAR TRACKERS

CROSS REFERENCE TO RELATED APPLICATION

This Application is a 371 of PCT/EP2015/062223 filed on Jun. 2, 2015, which claims priority of Spanish Application No. P201430983 filed Jun. 30, 2014, both of which are incorporated herein by reference.

TECHNICAL FIELD

The present invention relates to an azimuthal rotation mechanism for solar trackers of the type constituted by a vertical pedestal on which it is mounted with the capacity to rotate around the shaft of the pedestal, a rotating support holding the solar panels and actuated by means of hydraulic cylinders articulated to the support and the pedestal, by means of corresponding vertical shafts.

More specifically, the mechanism of the invention is intended for T-shaped solar trackers, with movement of the structure holding their reflecting surfaces in azimuth and elevator shafts with respect to the fixed pedestal.

BACKGROUND ART

Currently, there are numerous support and rotation mechanisms for solar tracker structures, which can be classified depending on the angular travel they offer, on their load capacity both in terms of retention and actuation, and on their precision in tracking the sun. And the clear objective of all of them is to reduce their manufacturing, assembly and maintenance costs for required features.

The azimuthal rotation mechanism is especially difficult and costly, regarding which U.S. Pat. No. 6,123,067 and WO2013/178850 A1, based on the actuation of two hydraulic cylinders, can be cited as background art.

The mechanism subject of U.S. Pat. No. 6,123,067 comprises a rotating frame that rotates around the pedestal, actuated by two hydraulic cylinders. This mechanism is complex, costly and exhibits the problem of large gaps, which require constant maintenance.

Patent application WO 2013/178850 A1 discloses an azimuthal hydraulic actuation mechanism materialized by means of two hydraulic cylinders attached to the same common shaft, but at a different height so that they do not cross, allowing a complete 360° rotation of the solar panel structure with respect to the support pedestal. The problem with this azimuthal mechanism is that its load capacity is too variable and imbalanced during its circumferential travel, such that in order to absorb the load of wind that the supporting structure can receive in any direction, it requires a significant oversizing of the entire mechanism, both for its actuating load capacity required to move the structure and for withstanding the wind without moving.

In addition to the load imbalance generated along the length of the azimuthal travel of the tracker by the actuation through two hydraulic cylinders, given their relative position with respect to each other and which is usually optimized in an angular separation between them of approximately 90°, there is another imbalance generated on the common shaft the cylinders are attached to, by having their ends arranged one on top of the other and causing an additional bending moment on the shaft with it. This load imbalance, derived from the relative position of the two cylinders with respect to each other on the one hand, and on the other, the fact that the ends of the cylinders are attached to the same common shaft but one on top of the other, requires having spherical ball-and-socket joints at the ends of these cylinders in their attachment to the shaft. These spherical ball-and-socket joints, which are expensive and occupy a lot of space, are arranged to absorb deformation deviations in the system by introducing imbalanced and off-centered loads to prevent the cylinders from breaking or a significantly reduced durability of the same and of their attachments to the rest of the azimuthal mechanism. Likewise, the mechanical rotating element between the movable part of the solar tracker and the fixed pedestal, which is usually a ball bearing, also experiences much greater loads as a consequence of the load imbalance transmitted by the cylinders to the common shaft they are attached to, requiring the oversizing of this mechanical rotating element, which is typically a ball bearing or a journal bearing, to attempt to minimize its greater wear while in operation and to achieve an acceptable degree of durability.

Document WO 2008/148919 A2 discloses system based on a hydraulically operated kinematic rod-crank mechanism including a tower which terminates downward in a moving ring which rotates in relation to a stationary ring by means of four hydraulic pistons in order to produce an azimuth movement. The tower terminates upward in a shaft parallel to the ring, on which shaft a sail, bearing solar collectors and actuated by two hydraulic pistons, can pivot in order to produce a zenith movement.

In central tower and heliostat field solar thermal plants, economies of scale to reduce the costs of generating electricity are resulting in increasingly larger plants, which require thousands of large heliostats leading to a solar field configuration of 360° surrounding the tower. For this type of solar fields, the angular travel in the azimuth shaft required for the heliostats is quite high, especially for heliostats situated in the southern area for solar plants located in the northern hemisphere of the earth, to the extent they require a complete rotation in order to track the sun at all times and avoid downtimes during the operation of the plant. In a wide angular travel azimuthal mechanism, provided with a limit switch, the effective azimuth rotation can be approximately 350°, that is to say, almost but not a complete rotation. In these cases and for the southern heliostat field, there are two types of singularities that take place during the operation of the plant when the heliostats track the sun. One of them is the singularity that could be called the azimuth blind spot singularity due to the failure to rotate completely, such that when the heliostat reaches its limit, it must turn around to be able to position itself to track the sun once again, losing its availability while engaging in said maneuver, which can last for about 30 minutes. However, there is another drawback which has a greater impact on the downtime of the heliostats in the southern field, which consists in the failure by the heliostats in the southern field to position themselves with a very low elevation angle, that is to say, too horizontally, to track the sun and send its reflected energy to the receiver located at the highest point of the tower at the tracking speed, which has to be sufficiently low to track the sun with the correct precision. In this case, the heliostat has to reposition itself by activating an emergency speed, which is much faster, to seek its closest tracking position to minimize its downtime.

This downtime may be minimized by providing the azimuthal mechanism with the ability to rotate completely, beyond 360°, as the elevation rotation range usually is limited to 90° or a bit more, to avoid making the actuation on the elevator shaft unnecessarily complicated and costly.

The hydraulic actuation in the azimuth shaft, based on hydraulic cylinders, is very attractive due to its reliability and low cost, and due to its high load capacity; however, its physical materialization is the key to achieve a high rotation capacity, beyond 360° and to work with a balanced load capacity along the length of its rotation to optimize the mechanism, and with it, the size of its hydraulic cylinders.

SUMMARY OF THE INVENTION

As provided above, the mechanism of the invention is of the type that comprises a vertical pedestal on which it is mounted, with the capacity to rotate around the shaft of the pedestal, a rotating support holding the solar panels and actuated by means of hydraulic cylinders articulated to the support and the pedestal by means of corresponding vertical shafts.

According to the invention, the mechanism comprises at least 3 hydraulic cylinders, located in the same horizontal plane. These 3 hydraulic cylinders are articulated through the casing to the rotating support by means of a first movable vertical rotation shaft, which is located outside the contour of the pedestal. On the other hand, the piston rods of the 3 cylinders pass through the wall of the rotating support through corresponding openings, and are articulated to the pedestal at the same height by means of a second fixed vertical rotation shaft, which is located inside the contour of said pedestal.

The arrangement described above allows the solar tracker to fully carry out its azimuthal travel, as well as its travel on the elevator shaft from 90° (vertical orientation) to at least 0° (horizontal orientation). The mechanism of the invention makes it possible to achieve a much more optimal balance along the 360° of azimuthal movement, not only for its hydraulic cylinders, but also for the entirety of its supporting structures, making it cheaper. This better balance provides in turn a much higher regulation capacity for its azimuthal movement while tracking the sun.

In addition, the arrangement of the three cylinders in the same plane does not generate the additional bending movement that would be generated on the common shaft they are attached to if the three cylinders were to be arranged one on top of the other, at least in two out of the three cylinders; this way, the need for spherical ball-and-socket joints at the end of each cylinder in their interface with respect to the common shaft, together with the arrangement of the three cylinders at 120°, would be avoided. Likewise, this better balancing of loads will allow the use of simpler and cheaper ball bearings as interface mechanical rotating elements between the movable tracker and its fixed pedestal, or even the use of friction bearings without affecting the sufficient degree of durability required.

Preferably the hydraulic cylinders shall be arranged angularly in equidistant positions. According to a preferred embodiment, the mechanism comprises 3 hydraulic cylinders arranged angularly with respect to one another at 120°.

Other relative position combinations among the cylinders are possible within the scope of this invention, if they allow defining a more compact mechanism with further freedom of movement for the solar tracker in its azimuth and elevation movement ranges, even when something may be lost in the load balancing, which in any case would always be better than that attainable with only two azimuth cylinders. A typical case would be, in the case of 3 cylinders, to modify the positioning of the 3 cylinders from a 120°-equidistant position among the cylinders, to a 60°-position among them, leaving the area towards which the solar tracker moves when going from 0° (horizontal) to 90° (vertical) while rising free and clear, making it possible to compact the azimuthal mechanism with it.

To affix the piston rods of the 3 hydraulic cylinders to the second vertical shaft, with said piston rods at the same height, the same are topped with structures at their ends that can be coupled to one another, through which said piston rods are articulated to the second vertical shaft at the same height.

The aforementioned structures can adopt, at least in two of the piston rods of the hydraulic cylinders, the shape of superimposable forks, which shall enfold the end of the piston rod of the third hydraulic cylinder.

The rotating support may be constituted by a cylindrical wall casing, which includes the openings for the passage of the piston rods of the 3 hydraulic cylinders. This cylindrical wall is closed at its bases by means of 2 triangle-shaped parallel plates, which protrude with respect to the cylindrical wall at least in its angular portions, forming pairs of lugs among which the casings of the hydraulic cylinders are articulated through the first vertical shafts, the lower plate being open at least according to the contour of the cylindrical wall with the purpose of allowing the passage of the second vertical shaft the piston rods of the three cylinders are articulated to at the same height.

BRIEF DESCRIPTION OF THE DRAWINGS

The attached drawings show, as a non-limitative example, a possible embodiment of the azimuthal mechanism of the invention.

DETAILED DESCRIPTION OF AN EMBODIMENT

Figure 1:
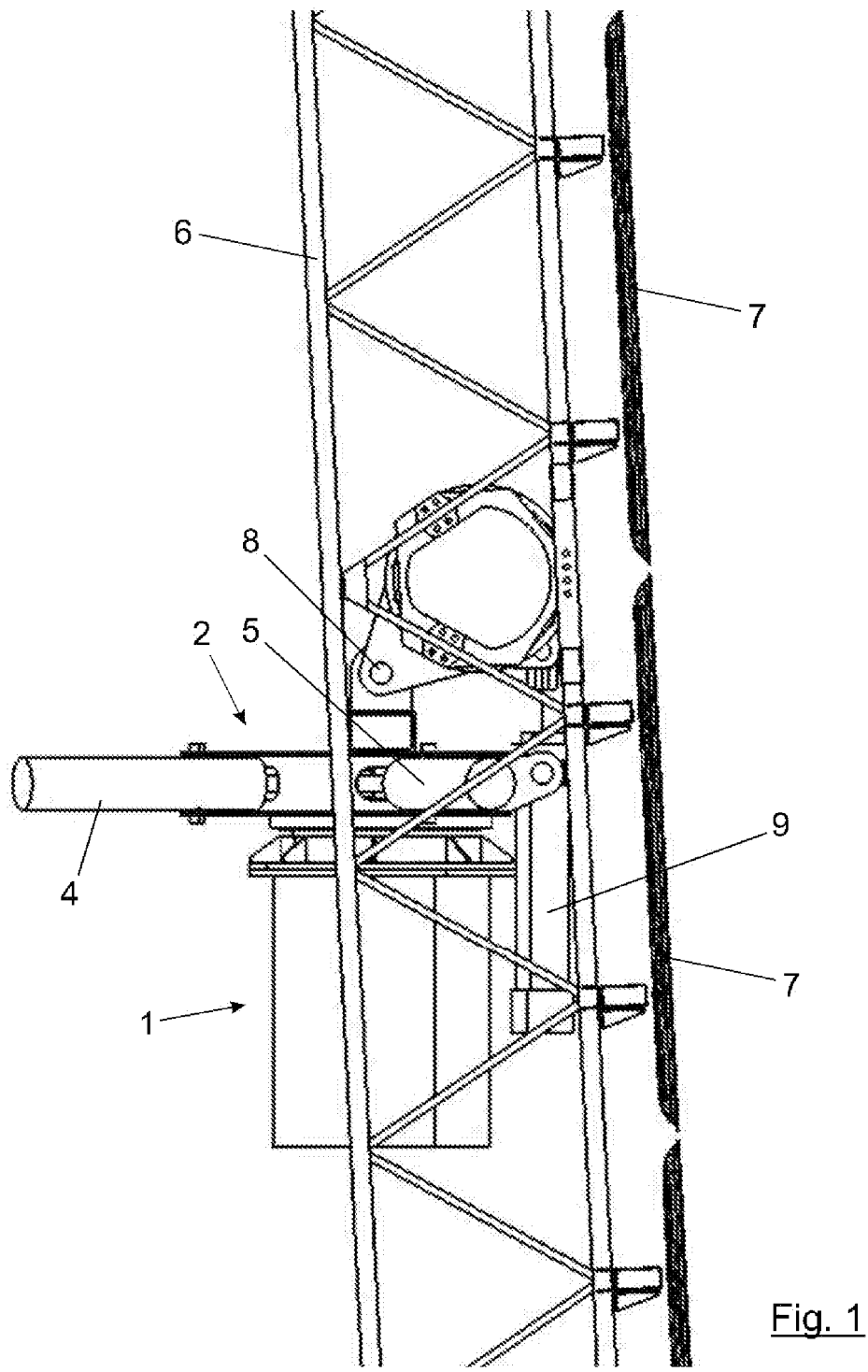
FIG. 1 shows a lateral elevational view of a solar tracker, with the solar panels in the vertical position, including the mechanism of the invention.
Figure 2:
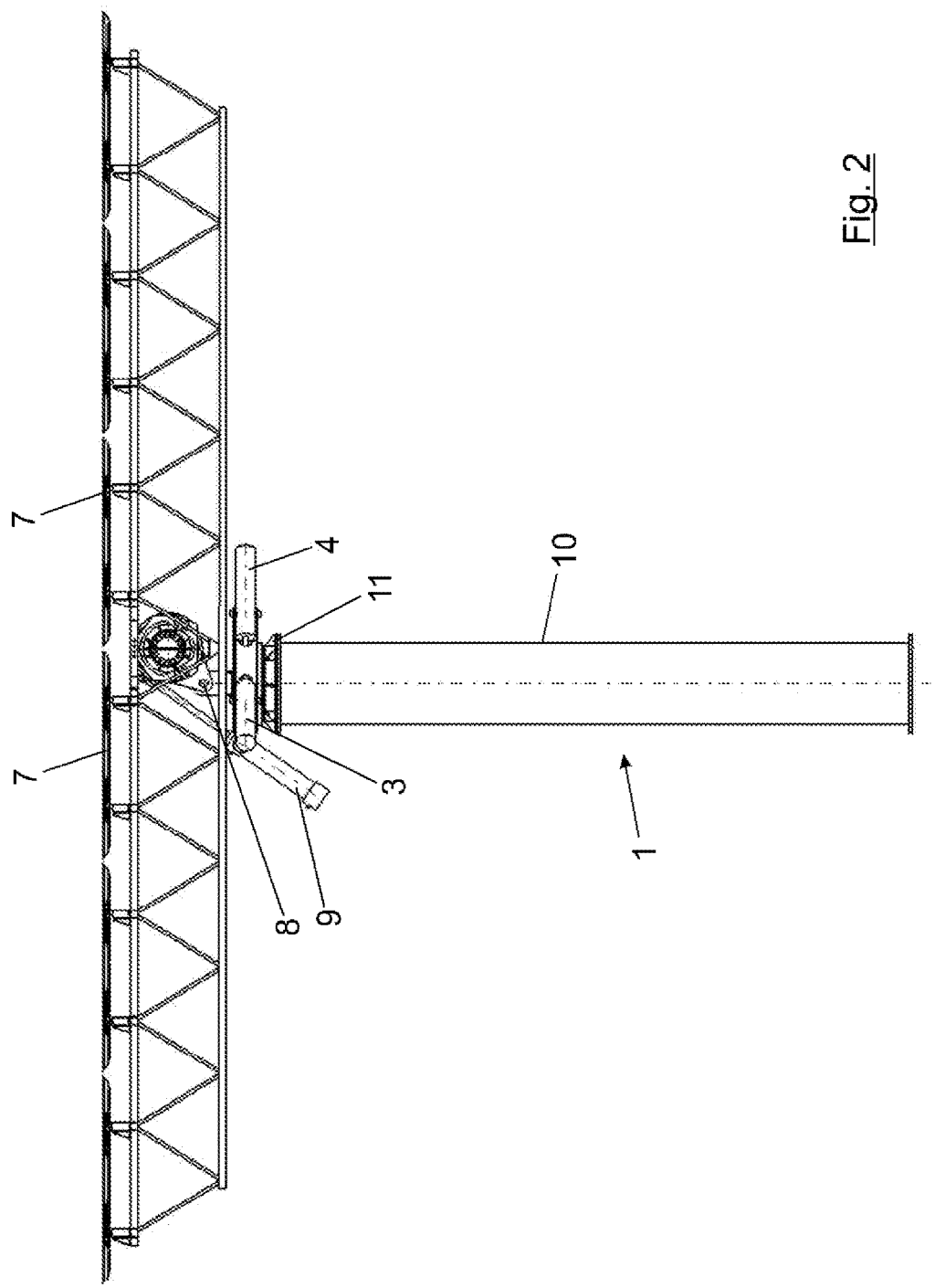
FIG. 2 shows a view similar to that of FIG. 1, with the solar panels in the horizontal position.

FIGS. 1 and 2 show a solar tracker composed of a fixed vertical pedestal (1), on which a rotating support (2) is mounted and that can rotate around a vertical shaft, coinciding with the shaft of the vertical pedestal (1). The rotation of the rotating support (2) is achieved by means of the joint actuation of three hydraulic cylinders (3, 4 and 5) preferably arranged in an equidistant angular position and located in the same horizontal plane.

The rotating support (2) holds the structure (6) on which the mirrors (7) are mounted, which receive the direct effects of the solar rays. The structure (6) may pivot around the horizontal shaft (8) between a vertical position, FIG. 1, and a horizontal position, FIG. 2, with the actuation of the elevator cylinder (9) which casing is articulated among the lugs of the support (2) that are joined together.

By means of the elevator cylinder (9), the mirrors (7) may occupy any position between a vertical position, FIG. 1, and a horizontal position, FIG. 2. On the other hand, by means of the joint actuation of the three hydraulic cylinders (3, 4 and 5), the mechanism can move from the position of FIG. 8A to any of the azimuthal and middle positions, as shall be explained below with reference to FIGS. 8A to 8F.

Figure 3:
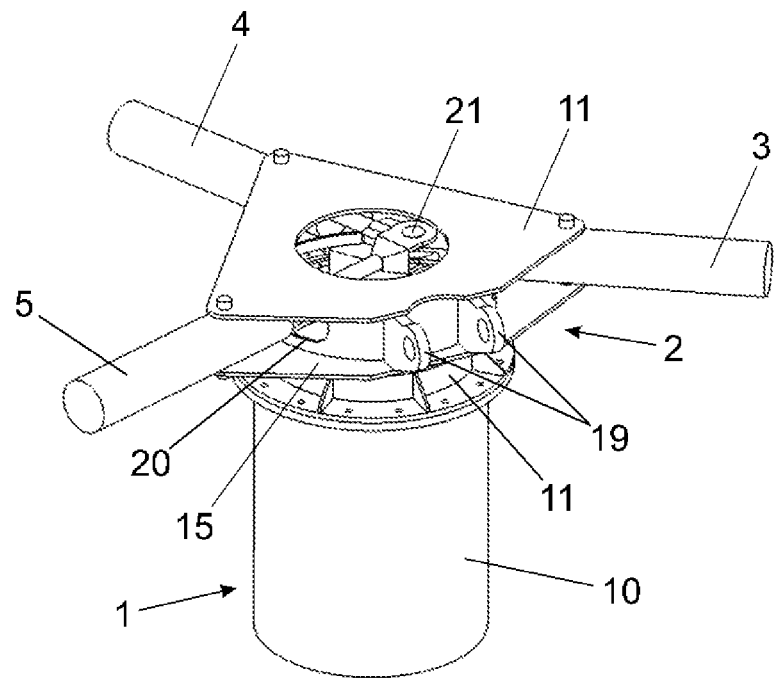
FIG. 3 shows the mechanism of the invention from a higher perspective.

FIG. 3 shows the vertical pedestal (1), comprised of a cylindrical column (10) and a head (11) attached to the column (10), forming the vertical axis pedestal (1) as a whole.

Figure 4:
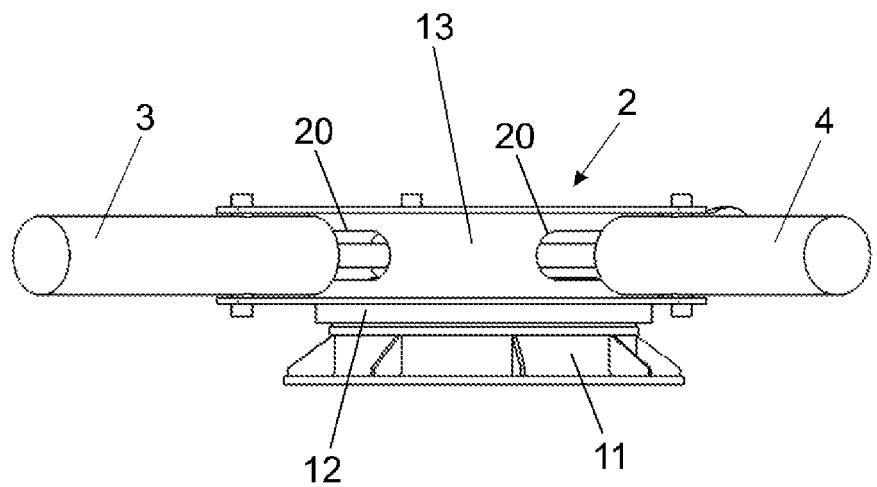
FIG. 4 is a lateral elevational view of the same mechanism.
Figure 7:
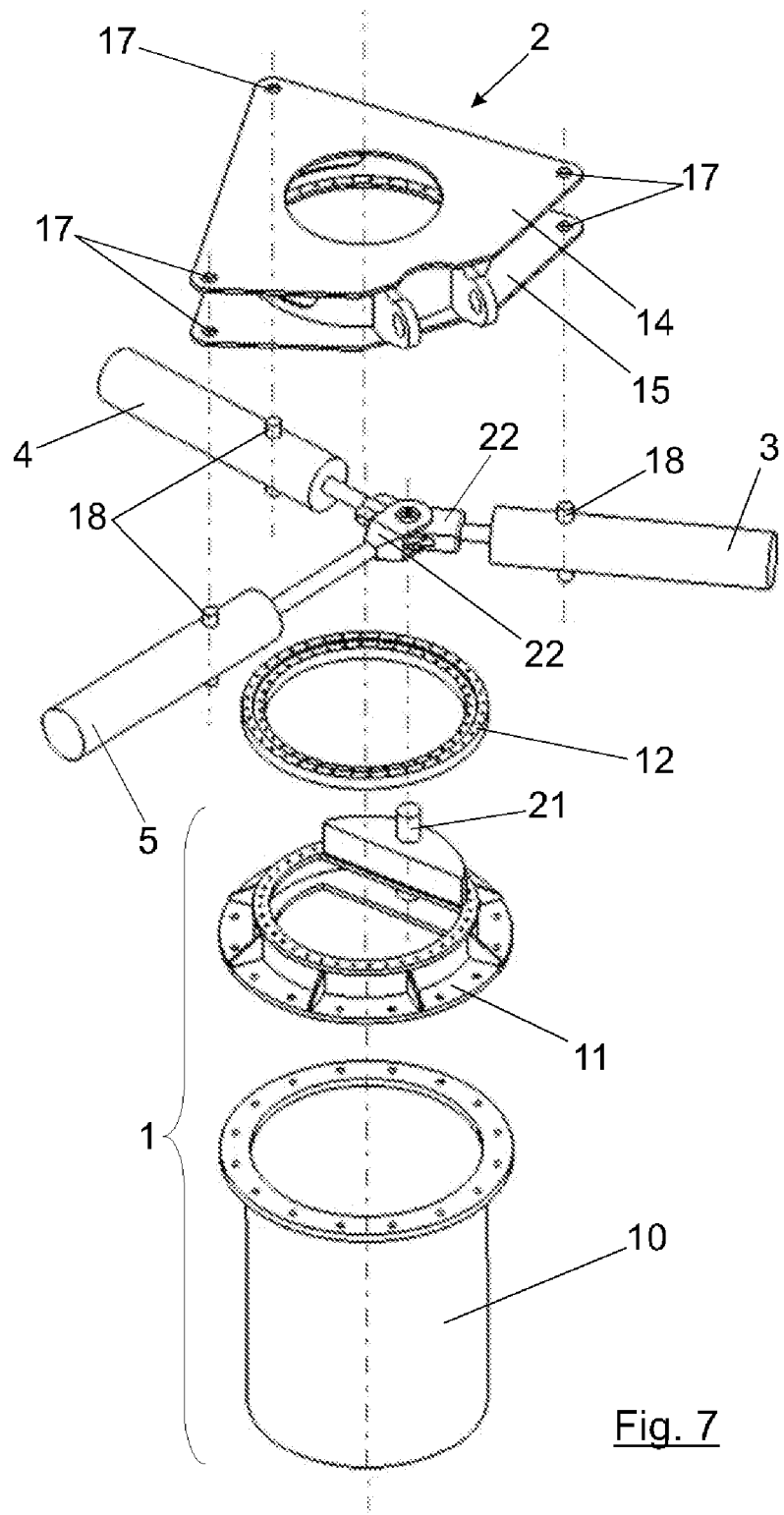
FIG. 7 is an exploded perspective view of the different components of the mechanism of the invention.

The rotating support (2) is mounted on the pedestal (1) and has the capacity to rotate around the vertical shaft of said pedestal by means of any known rotating support system, for example, by interposing a slewing bearing (12), FIGS. 4 and 7.

The rotation of the support (2) is achieved by means of the actuation of the hydraulic cylinders (3, 4 and 5).

Figure 5:
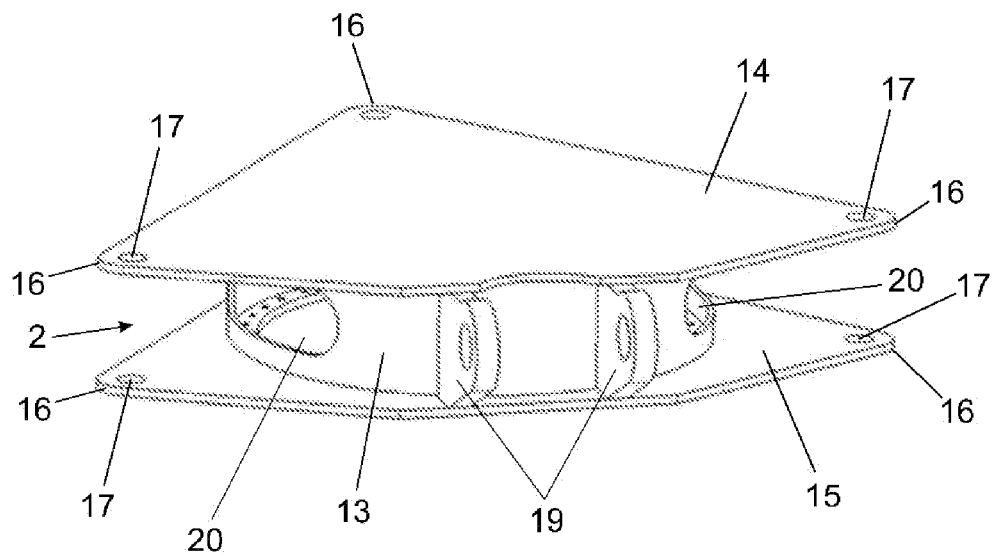
FIG. 5 shows the rotating support of the mechanism of the invention from a higher perspective.

In the embodiment of the example represented in FIGS. 4, 5 and 7, the rotating support is constituted by a cylindrical wall (13) and two triangle-shaped parallel plates (14 and 15), affixed to the cylindrical wall in matching positions and protruding from the cylindrical wall at least in the angular portions (16), which have vertically aligned openings (17) for the passage of a first vertical axis (18) that shall serve as the articulating means of the casing of the cylinders (3, 4, and 5) to the rotating support. The three shafts (18) are located outside the contour of the pedestal (1) and can move angularly in a direction perpendicular to said shafts.

Two outer lugs (19) are affixed to the cylindrical wall (13), among which the casing of the hydraulic cylinder (9) is articulated.

The cylindrical wall (13) has three openings (20), through which the hydraulic cylinders (3, 4 and 5) penetrate into the rotating support (2) to articulate the end of their piston rods, at the same height, to a second fixed vertical rotation shaft (21), joined together with the pedestal (1). This second fixed vertical rotation shaft (21) is located inside the contour of the pedestal.

Figure 6:
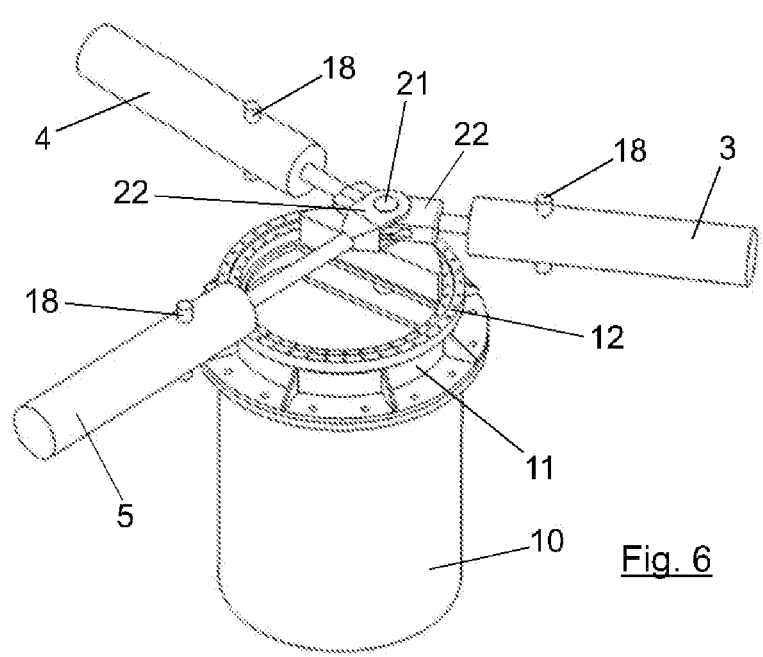
FIG. 6 shows the arrangement of the three hydraulic cylinders that become part of the mechanism of the invention in perspective.

As best shown in FIGS. 6 and 7, the piston rods of the hydraulic cylinders (3, 4 and 5) are topped with structures that can be coupled to each other, which can also adopt the shape of a fork (22). For the arrangement described above, at least the lower plate (15) of the rotating support (2) shall be open in its central area to allow the passage of the second vertical rotation shaft (21) and for it to be affixed to the pedestal (1). Likewise, the upper plate (14) may be open in its central part, as shown in FIGS. 3 and 7).

Preferably, the hydraulic cylinders (3, 4 and 5) shall be arranged in the same horizontal plane, in angularly equidistant positions, such that in the case of three cylinders the same shall be separated from each other at 120°.

FIGS. 8A to 8F represent different angular positions of the rotating support (2), through the actuation of the hydraulic cylinders (3, 4 and 5).

Figure 8A:
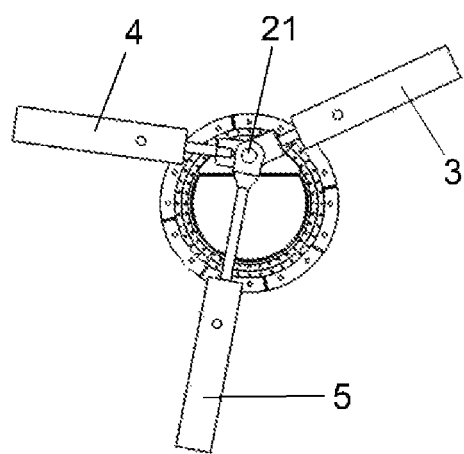
FIGS. 8A to 8F show a plan view of successive positions of the mechanism, obtained with the actuation of the three hydraulic cylinders.
Figure 8B:
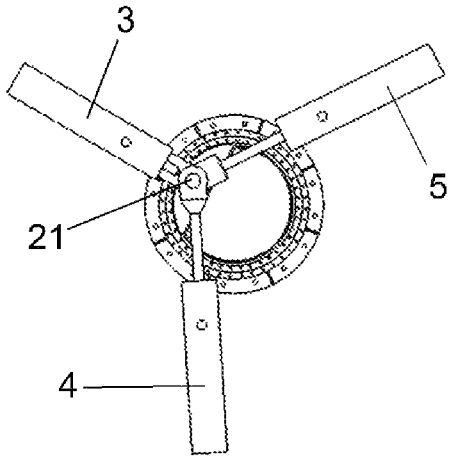
Figure 8C:
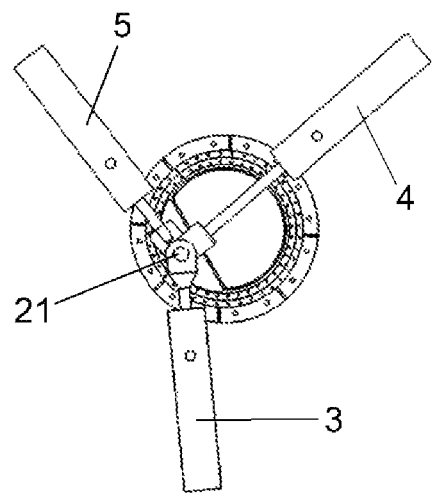
Figure 8D:
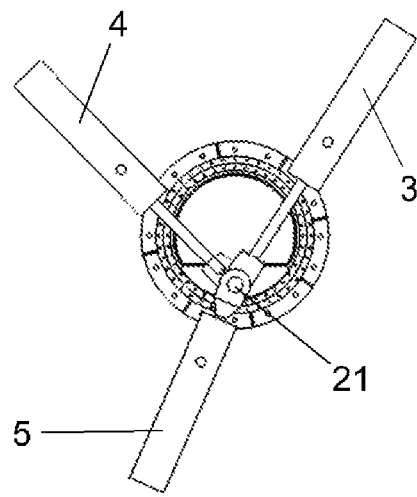
Figure 8E:
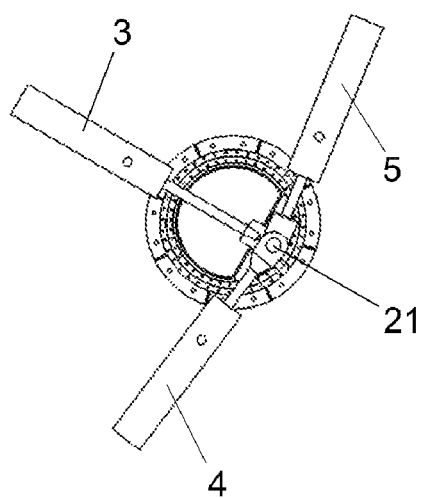
Figure 8F:
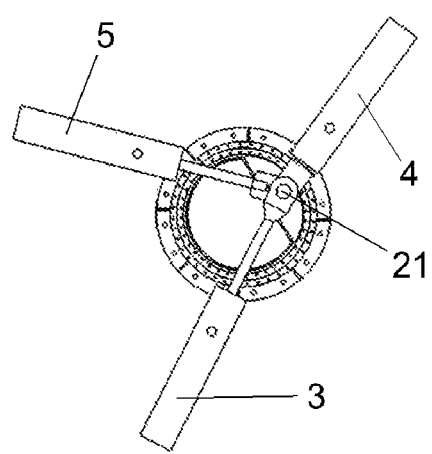

FIG. 8A represents an azimuth position of 0°, based on which successive azimuth positions are represented. 60° in FIG. 8B, 120° in FIG. 8C, 180° in FIG. 8D, 240° in FIG. 8E and 300° in FIG. 8F.

In all cases, the second vertical shaft (21) is located in the same position, since it is affixed to the pedestal (1), while the cylinders (3, 4 and 5) vary in length and position, as well as the first vertical shaft (18), causing the rotation of the rotating support (2) holding the frames (6) that hold the mirrors (7) for orientation purposes.

The invention claimed is:

1. An azimuthal rotation device for solar trackers comprising:
    a vertical pedestal having a cylindrical shape comprising a center and an outer surface defined by a radius;
    a fixed rotation shaft coupled to the vertical pedestal, the fixed rotation shaft being located at a distance from the center that is smaller than the radius; and
    a rotating support mounted on the vertical pedestal, the rotating support being adapted to hold one or more solar panels the rotating support comprising:
    a first plate disposed on the vertical pedestal, the first plate including first, second and third holes;
    a cylindrical wall disposed on the first plate, the cylindrical wall having a plurality of openings;
    a second plate disposed on the cylindrical wall, the second plate including fourth, fifth, and sixth holes, wherein the first and fourth holes form a first pair of aligned holes, the second and fifth holes form a second pair of aligned holes, and the third and sixth holes form a third pair of aligned holes; and
    first, second, and third hydraulic cylinders located in a horizontal plane between the first and second plates, each of the first, second, and third hydraulic cylinders comprising:
        a movable rotation shaft that passes through a corresponding pair of holes in the first and second plates, thereby connecting the respective hydraulic cylinder to the first and second plates; and
        a respective piston rod that passes through a corresponding one of the plurality of openings of the cylindrical wall and is connected to the fixed rotation shaft.

2. The device according to claim 1, wherein each respective piston rod includes:
    an end proximate the fixed rotation shaft;
    a connecting structure adapted to connect the end to the fixed rotation shaft.

3. The device according to claim 1, wherein:
    the first and second hydraulic cylinders are angularly displaced by a first angle, the second and third hydraulic cylinders are angularly displaced by a second angle, and the first and third hydraulic cylinders are angularly displaced by a third angle; and
    the first, second, and third angles are equal.

4. The device according to claim 3, wherein each of the first, second, and third angles equals 120°.

5. The device according to claim 1, wherein:
    the first piston rod includes a first end proximate the fixed rotation shaft, the first end having a first fork shape formed by first and second prongs;
    the second piston rod includes a second end proximate the fixed rotation shaft, the second end having a second fork shape formed by third and fourth prongs;
    the third piston rod has a third end proximate the fixed rotation shaft; and
    the third end is disposed between the first and second prongs and between the third and fourth prongs.

6. The device according to claim 3, wherein the first plate includes a second opening; and
    the fixed rotation shaft passes through the second opening.

* * * * *